United States Patent [19]

Tanner

[11] Patent Number: 4,478,240
[45] Date of Patent: Oct. 23, 1984

[54] AIR PILOT VALVE CONTROLLER

[76] Inventor: William D. Tanner, 3154 E. 26th, Tulsa, Okla. 74114

[21] Appl. No.: 373,973

[22] Filed: May 3, 1982

[51] Int. Cl.³ .................. F16K 43/00; F16K 31/122
[52] U.S. Cl. .................................. 137/315; 92/129; 92/131; 137/625.66; 251/63.4; 251/63.6; 251/284
[58] Field of Search ................. 92/129, 131; 137/625.66, 625.69, 315; 251/63.5, 63.6, 284, 63.4, 62

[56] References Cited

U.S. PATENT DOCUMENTS

| | | | |
|---|---|---|---|
| 2,439,523 | 4/1948 | Miller et al. | 251/63.6 |
| 2,665,713 | 1/1954 | Crookston et al. | 251/63.6 |
| 2,928,380 | 3/1960 | Krapf | 137/625.69 |
| 3,472,269 | 10/1969 | Scholle | 251/63.4 |
| 3,991,661 | 11/1976 | Mocha | 92/131 |
| 4,114,378 | 9/1978 | Stanuszek | 92/129 |
| 4,372,333 | 2/1983 | Goans | 251/63.4 |

FOREIGN PATENT DOCUMENTS

| | | | |
|---|---|---|---|
| 219471 | 2/1942 | Switzerland | 92/129 |
| 171919 | 12/1921 | United Kingdom | 92/131 |
| 2076120 | 11/1981 | United Kingdom | 137/269 |

*Primary Examiner*—George L. Walton
*Attorney, Agent, or Firm*—Head, Johnson & Stevenson

[57] ABSTRACT

A fluid actuated control device for operable connection with a hydraulic valve, such as a pilot valve, and comprising a coupler bolt secured directly to the valve spool, a fluid actuated cylinder and piston assembly connected with the coupler bolt for reciprocation thereof, a helical spring member disposed around at least a portion of the coupler bolt and cooperating with a pair of oppositely disposed spring retainer cups for maintaining a normal neutral position for the valve spool, the coupler bolt being reciprocal by the fluid actuated cylinder and piston assembly upon the application of fluid pressure to the assembly for shifting of the valve spool from a remote position without interference with the normal manual operation of the valve.

3 Claims, 2 Drawing Figures

AIR PILOT VALVE CONTROLLER

BACKGROUND OF THE INVENTION

1. Field of the Invention

This invention relates to improvements in valves and more particularly, but not by way of limitation, to a fluid powered device for actuation of a hydraulic control valve.

2. Description of the Prior Art

Many hydraulic control valves are in use today, such as pilot valves, and the like, and these valves normally include a reciprocal valve spool for selective shunting of the flow of fluid through the valve. These valves are frequently of a manually actuated type, or a remotely controlled type, but generally a manually actuated valve cannot be operated from a remote position, and a remotely controlled valve cannot be manually activated. The disadvantages of this will be readily apparent.

SUMMARY OF THE INVENTION

The present invention contemplates a novel control device for use in combination with a hydraulic control valve whereby the valve may be actuated from a remote position while retaining the manual control feature of the valve. The novel control device is fluid actuated and replaces the existing valve spool end cap on the usual hydraulic control valve. The novel control device may be operated by a regulated fluid source to provide for precise valve spool positioning, and is of relatively small overall dimensions to permit use thereof on adjacent valve sections of a "stackable" valve bank. In order to install the novel device on an existing hydraulic control valve, the valve spool end cap may be removed for providing access to the outer end of the valve spool. A spring urged coupler bolt may be secured to the valve spool and operably connected with the reciprocal piston rod of a fluid cylinder. The cylinder is in communication with a source of power fluid, preferably air, but not limited thereto, which supplies a regulated fluid pressure for reciprocation of the piston rod in order to acheve precise valve spool positioning. The normal manual actuation of the valve spool is not in any manner altered, thus providing a hydraulic valve which may be either manually actuated, or activated by remote control. The novel device is simple and efficient in operation and economical and durable in construction.

DETAILED DESCRIPTION OF THE PREFERRED EMBODIMENT

Figure 2:
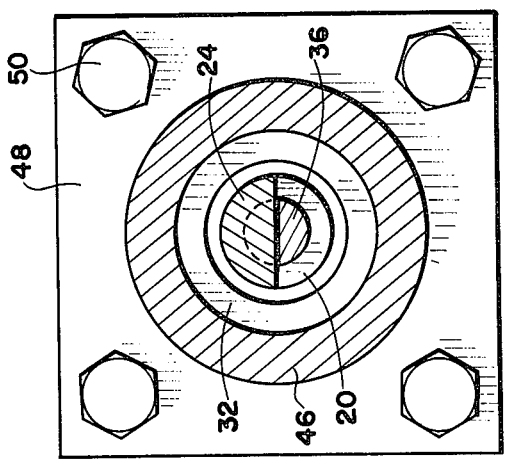
FIG. 2 is a view taken on line 2—2 of FIG. 1.

Referring to the drawings in detail, reference character 10 generally indicates a fluid powered control device adapted to be secured to housing of any suitable hydraulic control valve 12, such as a pilot valve, in lieu of the usual valve end cap (not shown) normally provided with the valve 12. The device 10 comprises a coupler bolt 14 having a threaded stem 16 provided at one end thereof for threaded engagement with the usual reciprocal valve spool member 18 of the hydraulic valve 12. An enlarged diameter body portion 20 is spaced from the threaded element 16 by a smooth walled rod portion 22, and a substantially L-shaped arm member extends axially outwardly from the body 20 in a direction away from the spool member 18, as particularly shown in FIG. 1. The L-shaped configuration of the arm 24 provides a hook member 26 for a purpose as will be hereinafter set forth.

A first spring retainer flanged cup 28 normally provided with the valve 12 is disposed around the outer end of the spool member 18 for receiving one end of a suitable helical spring 30 therearound, and a second substantially identical but oppositely disposed spring retainer cup 32 also provided with the valve 12 is disposed around the body 20 for receiving the opposite end of the spring 30 therearound. It will be readily apparent that the spring 30 is captured by the spring retainer which results in a cancellation of the spring force in a neutral position of the coupler bolt 14 and valve spool 18 secured thereto.

The hook member 26 engages a complementary recess 34 provided in the outer periphery of a rod member 36 of a reciprocal piston head 38 slidably disposed within a suitable fluid cylinder 40. The cylinder 40 is provided with a reduced neck 42 at one end thereof having external threads for threaded engagement with a bore 44 provided in one end of an end cap member 46 which is disposed over and around the coupler bolt 14 and spring means 30. The end cap 46 is preferably provided with an outwardly extending circumferential flange 48 at the open outer end thereof and may be secured to the valve 12 in any suitable manner, such as by a plurality of spaced bolts 50, as is well known. An inwardly directed annular shoulder 52 is provided on the inner periphery of the end cap 46 for receiving the second spring retainer cap 32 thereagainst in the normal position of the valve spool 18, and as shown in FIG. 1 the engagement between the retainer cap 32 and the shoulder 52 limits the movement of the retainer cap 32 in a right hand direction as viewed in FIG. 1.

In operation, the control device 10 may be secured to the valve 12 in lieu of the usual valve end cap (not shown) by removing the originally installed end cap and unscrewing the usual shoulder bolt (not shown) threadedly engaged with the longitudinally extending bore 54 of the spool 18. The stem 16 of the coupler bolt 14 may then be threadedly engaged with the bore 54 for securing the coupler bolt to the spool. The end cap or housing 46 may then be loosely disposed around the coupler bolt and retainer cups and associated spring means 30. The rod member 36 may be extended a sufficient distance beyond the outer end of the threaded neck 42 whereby the rod may be inserted through the bore 44 and into the interior of the housing 46 for engaging the notch or recess 34 with the hook member 26. The cylinder 38 may then be grasped or otherwise held stationary, and the end cap or housing 46 may be manually rotated about its own longitudinal axis for threadedly engaging the bore 44 with the neck 42. The housing 46 may then be secured to the valve 12 by means of the bolts 50, or the like.

The spring means 30 normally maintains the first spring retainer cap 28 in a position against the spool 18 and the second spring retainer cap 32 in position against the annular shoulder 21 of the coupler bolt 14. This position holds the valve spool 18 in a neutral position within the valve 12.

Figure 1:
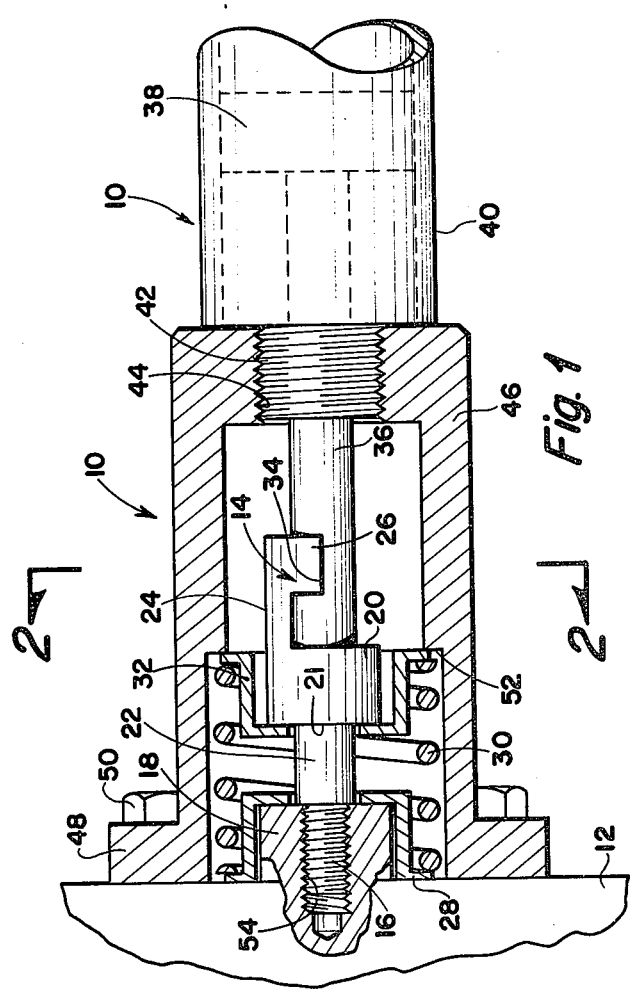
FIG. 1 is a sectional elevational view of a fluid power remote control device embodying the invention, with portions shown in elevation for purposes of illustration.

When it is desired to shift the valve spool 18 in a left hand direction as viewed in FIG. 1 for shunting the flow of fluid through the valve 12, a regulated fluid pressure may be applied against the outer face of the piston head 38 in the usual manner for moving the head 34 and rod member 36 in a left hand direction. The coupler bolt 14 moves against the force of the spring 30 simultaneously with the rod 36 and thus moves the spool 18 in the left hand direction. Of course, the length of travel in the left hand direction is limited by the engagement of the second spring retainer cup with the first retainer cup to provide a positive control of the limitation of movement for the spool 18.

In order to return the spool member to the neutral position thereof, the pressure acting on the piston head 34 may be relieved or released, whereupon the spring means 30 moves the coupler bolt 14 in a right hand direction until the second spring retainer cup 32 engages the shoulder 21.

When it is desired to move the spool 18 in a right hand direction, fluid pressure may be applied against the inner face of the piston head 34 in the usual or well known manner whereby the rod 36 is moved in a right hand direction. The coupler bolt 14 moves simultaneously with the rod 36 and against the force of the spring means 30 for moving the spool member 18 in said right hand direction. Of course, the length of travel of the spool 18 will be limited by the engagement between the spring retainer cups 28 and 32, thus providing a positive control limit for the movement of the spool 18 in both the right and left hand directions. It will be readily apparent that the actual force or pressure applied against the piston head 34 during either direction of movement thereof, as related to the force of the spring means 30, will provide a precise length of travel for the valve spool 18 as required for the desired performance of the valve 12. It will be further apparent that the normal mechanism (not shown) for the manual actuation of the valve 12 is not in any manner altered by the installation of the device 10 on the valve 12 in lieu of the usual valve end cap member.

It is to be noted that the spring means 30 provided with the valve 12 may be replaced with a similar spring means having either a greater or lesser strength as required for the end performance requirements of the valve 12. The spring means 30 may be matched to the valve operation and use, and similarly, a matched variable air valve (not shown) may be utilized for supplying the fluid pressure for the actuation of the piston 34–36. Of course, suitable inlet and outlet ports (not shown) may be provided in the cylinder 40 and on opposite sides of the piston head 34 for facilitating the reciprocation of the piston within the cylinder, as is well known.

Furthermore, it is preferable that the overall size of the device 10 be sufficiently small for installation on adjacent valve sections of a "stackable" valve bank. In addition, whereas it is preferable that the cylinder 40 and piston 34–36 be pneumatically actuated by means of an air valve, it is to be noted that substantially any desired or suitable fluid may be utilized for actuation thereof.

From the foregoing it will be apparent that the present invention provides a novel fluid actuated control device for a hydraulic control valve, pilot valve, or the like, which may be installed on the valve in lieu of the normal end cap means to provide for remote control of the valve without interference of the normal manual valve activation mechanism. The novel control device may be connected directly with the valve spool for providing precise reciprocation thereof to assure an efficient and effective valve operation.

Whereas the present invention has been described in particular relation to the drawings attached hereto, it should be understood that other and further modifications, apart from those shown or suggested herein may be made within the spirit and scope of this invention.

What is claimed is:

1. In combination with a hydraulic valve having a reciprocal spool member, a fluid actuated control device comprising spring urged coupler bolt means secured directly to the spool member, an independent reciprocal piston having rod means operably and releasably engaged to the coupler bolt means for reciprocation thereof, end cap means secured to the valve for encasing the coupler bolt means and supporting the piston rod means a piston operator housing encasing the reciprocal piston and at least a portion of the piston rod means, upon installation said piston housing being secured to the end cap through an opening in the end cap through rotation of said piston housing in one direction for engaging the at least other portion of the piston rod means to the coupler bolt means, upon removal of the operator housing from the end cap said operator housing is rotated in an opposite direction to first disengage the at least other piston rod means portion from the coupler bolt means within the end cap so that the operator housing, the reciprocal piston and the piston rod means can be removed from the end cap as a single unit without disturbing the other components of the hydraulic valve, the spring urged coupler bolt means includes helical spring means surrounding at least a portion of the coupler bolt means, and a pair of spaced oppositely disposed spring retainer cup means cooperating with the end cap means for limiting the movement of the coupler bolt in opposite reciprocal directions.

2. In combination with a hydraulic valve having a reciprocal spool member, a fluid actuated control device as set forth in claim 1 wherein the coupler bolt means comprises an axially extended stem member threadedly engaged with the spool member, a body member secured to the stem member, and a substantially L-shaped arm member extending axially outwardly from the body member in a direction away from the spool member for engagement with the piston rod means.

3. In combination with a hydraulic valve having a reciprocal spool member, a fluid actuated control device as set forth in claim 2 wherein the piston rod means includes a rod member having a recess on the outer periphery thereof for engagement with the L-shaped arm member.

* * * * *